United States Patent
Vilinski et al.

(10) Patent No.: US 12,366,835 B2
(45) Date of Patent: Jul. 22, 2025

(54) COMPRESSED AIR PROVISION DEVICE AND METHOD

(71) Applicant: Festo SE & Co. KG, Esslingen (DE)

(72) Inventors: Aleg Vilinski, Esslingen (DE); Daniel Klassen, Esslingen (DE); Silvia Gramling, Weinstadt (DE)

(73) Assignee: Festo SE & Co. KG, Esslingen (DE)

( * ) Notice: Subject to any disclaimer, the term of this patent is extended or adjusted under 35 U.S.C. 154(b) by 766 days.

(21) Appl. No.: 17/488,941

(22) Filed: Sep. 29, 2021

(65) Prior Publication Data
US 2022/0100155 A1   Mar. 31, 2022

(30) Foreign Application Priority Data
Sep. 29, 2020   (DE) .......................... 102020212296.2

(51) Int. Cl.
| | | |
|---|---|---|
| *G05B 13/04* | (2006.01) | |
| *G05B 13/02* | (2006.01) | |
| *G06N 20/10* | (2019.01) | |

(52) U.S. Cl.
CPC ......... *G05B 13/041* (2013.01); *G05B 13/029* (2013.01); *G06N 20/10* (2019.01)

(58) Field of Classification Search
CPC .. G05B 13/041; G05B 13/029; G05B 13/044; G05B 13/04; G06N 20/10; G06N 20/00
See application file for complete search history.

(56) References Cited

U.S. PATENT DOCUMENTS

| | | | |
|---|---|---|---|
| 2011/0110795 A1 | 5/2011 | Van Campfort et al. | |
| 2016/0245273 A1* | 8/2016 | Wagner | G05D 16/2066 |
| 2019/0383284 A1* | 12/2019 | Park | F04B 49/065 |
| 2021/0026334 A1* | 1/2021 | Mazur | G05B 13/0265 |

FOREIGN PATENT DOCUMENTS

| | | |
|---|---|---|
| CN | 102077008 A | 5/2011 |
| CN | 110942134 A | 3/2020 |

OTHER PUBLICATIONS

Johan Georg Urban Pettersson, Compressed air installation control method, uses controller employing neural network or fuzzy technique (espacenet machine translation of application BE1017421A3), Jul. 18, 2006, espacenet machine translation, Application BE107421A3 (Year: 2006).*

(Continued)

*Primary Examiner* — Christopher W Carter
(74) *Attorney, Agent, or Firm* — Hoffmann & Baron, LLP (57) ABSTRACT

A compressed air provision device (4) for carrying out a closed-loop control, in particular a closed-loop position control and/or a closed-loop pressure control, on the basis of controller parameters (RP), wherein the compressed air provision device (4) has a machine-learning model (55) and is designed to provide, using the machine-learning model (55), the controller parameters (RP) on the basis of entered system parameters (SP) which describe physical properties of a system (100) in which the compressed air provision device (4) is to be used, and to carry out the closed-loop control on the basis of the provided controller parameters (RP).

14 Claims, 8 Drawing Sheets

(56) References Cited

OTHER PUBLICATIONS

Song Q., et al. "Neural Network Modeling and Disturbance Observer Based Control of a Pneumatic System," In 2nd IEEE/ASME International Conference on Mechanics and Embedded Systems and Applications, pp. 1-5, 2006. https://ieeexplore.ieee.org/abstract/document/4077833 [abgerufen am Sep. 6, 2021].
Kothapalli G., et al. "Design of a Neural Network Based Intelligent PI Controller for a Pneumatic System," In: IAENG International Journal of Computer Science, pp. 1-9, 2008. http://www.iaeng.org/IJCS/issues_v35/issue_2/IJCS_35_2_05.pdf [abgerufen am Sep. 6, 2021].
Fujiwara A., et al. "Neural network based adaptive I-PD controller for pneumatic cylinder," In: SICE '95. Proceedings of the 34th SICE Annual Conference, International Session Papers, pp. 1281-1284, 1995. https://ieeexplore.ieee.org/stamp/stamp.jsp?tp=&arnumber:526695 [abgerufen am Sep. 6, 2021].
Ali H., et al. "A Review of Pneumatic Actuators (Modeling and Control)," In Australian Journal of Basic and Applied Sciences, pp. 440-454, 2009. https//www.researchgate.net/publication/223260423_A_Review_of_Pneumatic_Actuators_Modeling_and_Control [abgerufen am Aug. 6, 2021].
Chinese Office Action dated Apr. 22, 2025.

\* cited by examiner

COMPRESSED AIR PROVISION DEVICE AND METHOD

BACKGROUND OF THE INVENTION

The invention relates to a compressed air provision device for carrying out closed-loop control, in particular closed-loop position control and/or closed-loop pressure control, on the basis of controller parameters. The closed-loop control controls the provision of compressed air.

In the following, "control" especially refers to "closed-loop control" and "controller" especially refers to a "closed-loop controller".

The compressed air provision device comprises, for example, a valve terminal and is used in particular to provide servo-pneumatics—that is, closed-loop pneumatic position control. The closed-loop control is in particular a non-linear closed-loop control. The controller parameters on the basis of which the closed-loop control takes place are, for example, controller gains. The controller parameters are closed-loop controller parameters. The controller gains are closed-loop controller gains.

In order to achieve a good closed-loop control performance, the controller parameters must be adapted to the respective system—i.e. the respective application—in which the compressed air provision device is used.

In the systems—i.e. the applications—which are suitable for use of the compressed air provision device, there is a wide variation of physical characteristics (e.g. different masses and/or dimensions) which, in order to achieve good control performance, must be taken into account when determining the controller parameters.

However, the user of the compressed air provision device usually does not know how to set the controller parameters in order to adapt the closed-loop control to the physical characteristics of the present system.

SUMMARY OF THE INVENTION

One object of the invention is to provide a compressed air provision device that allows easy adaptation of the controller parameters to the respective system.

The object is solved by a compressed air provision device having a machine-learning model and being adapted to provide, using the machine-learning model, the controller parameters based on entered system parameters describing physical characteristics of a system in which the compressed air provision device is to be used, and to perform the closed-loop control based on the provided controller parameters.

The machine-learning model in particular represents a mapping of the system parameters to the controller parameters. In particular, the machine-learning model approximates a non-linear relationship between the system parameters and the controller parameters. For example, the machine-learning model is based on a support vector regression, a regression tree and/or an artificial neural network. Preferably, the machine-learning model is based on a regression method. In particular, the machine-learning model is an artificial intelligence model.

The system parameters include, for example, a dimension, a volume, a mass, a friction, an angle, and/or a pressure.

The compressed air provision device makes it in particular possible for a user to enter the system parameters into the compressed air provision device for the adaptation of the controller parameters to the respective system, and the compressed air provision device then autonomously determines, on the basis of the system parameters using the machine-learning model, the controller parameters to be used for the closed-loop control. Typically, the user knows or can determine the system parameters of their system without much effort. Preferably, the user only needs to enter the system parameters to adjust the controller parameters. The controller parameters provided by means of the machine-learning model expediently serve as default parameterization for the present system, in particular the present application.

The invention further relates to a method of operating the compressed air provision device, comprising the steps of: by using the machine-learning model, providing the controller parameters based on the input system parameters, and performing the closed-loop control based on the provided controller parameters.

The invention further relates to a method for providing a machine-learning model, comprising the steps of:

performing a plurality of simulations of a system with a controller and a controlled section for a plurality of set combinations of system parameter sets, which describe physical properties of the system, and controller parameter sets, on the basis of which the controller performs control of the controlled section, each simulation being performed for a respective set combination of a system parameter set and a controller parameter set, based on the simulations, calculating a respective control cost value for each set combination, selecting set combinations based on the calculated control cost values, creating a training data set based on the selected set combinations and training the machine-learning model with the training dataset.

A system parameter set is a set of system parameters. A control parameter set is a set of control parameters.

The control cost value is in particular a closed-loop control cost value.

Preferably, the training data set comprises only set combinations with a low control cost value, i.e., in particular, a control cost value that is below a threshold value, in particular, a control threshold value, for example a closed-loop control threshold value. For example, the training data set comprises only set combinations with a sufficient quality.

The invention further relates to a further method of providing a machine-learning model, comprising the steps of:

by using the machine-learning model, providing a controller parameter set based on a system parameter set that describes the physical characteristics of a system with a controller and a controlled section, performing a simulation of the system, wherein the controller performs a closed-loop control of the controlled section based on the controller parameter set, calculating a control cost value based on the simulation and depending on the control cost value, adjusting the machine-learning model and repeating the above steps.

BRIEF DESCRIPTION OF THE DRAWINGS

Exemplary details and exemplary embodiments are explained below with reference to the figures. Thereby shows.

DETAILED DESCRIPTION

Figure 1:
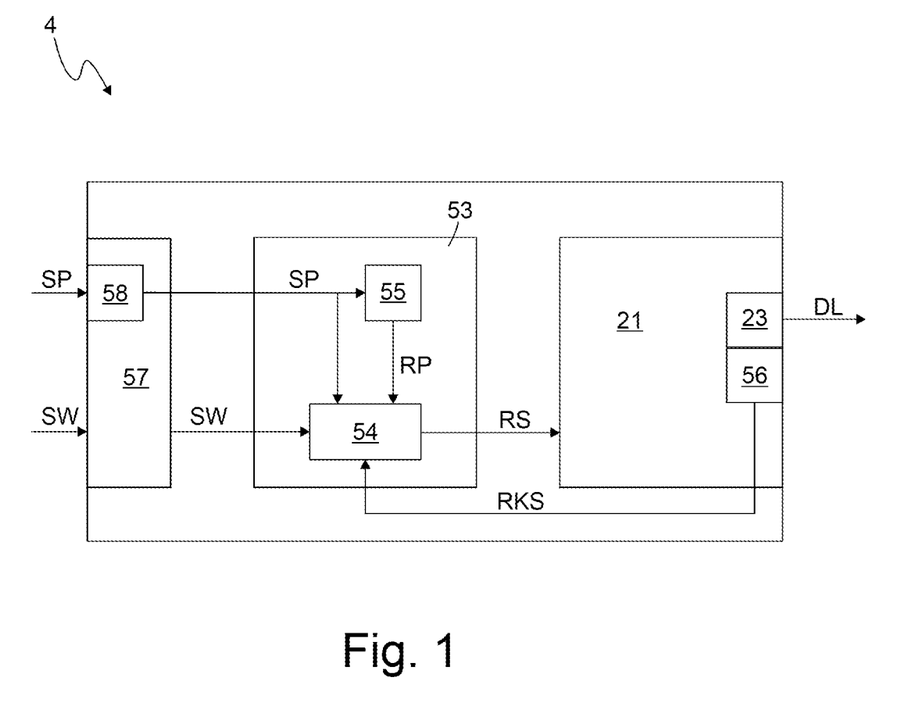
FIG. 1 a schematic representation of a compressed air provision device.

FIG. 1 shows a compressed air provision device 4 which serves to perform a closed-loop control, in particular a closed-loop position control and/or a closed-loop pressure control, on the basis of controller parameters RP. The controller parameters RP are closed-loop controller parameters. The closed-loop control is in particular a non-linear closed-loop control. Furthermore, the closed-loop control may be a linear closed-loop control.

Exemplarily, the compressed air provision device 4 comprises a computing unit 53, for example a microcontroller, on which a controller 54, in particular a controller algorithm, is executed. The controller 54 is a closed-loop controller. The controller algorithm is a closed-loop controller algorithm. The controller 54 provides a controller signal RS based on a setpoint SW and in particular a feedback signal RKS. The controller 54 is parameterized via the controller parameters RP. The controller parameters RP are, for example, controller gains. The controller gains are closed-loop controller gains.

Exemplarily, the compressed air provision device 4 comprises a valve device 21 which has a pressure output 23 and outputs the compressed air DL at the pressure output 23 in accordance with the controller signal RS. Expediently, the compressed air provision device 4, in particular the valve device 21, comprises a sensor arrangement 56 which provides the feedback signal RKS. The sensor arrangement 56 detects, for example, a position and/or a pressure.

The compressed air provision device 4, in particular the computing unit 53, has a machine-learning model 55 and is configured to use the machine-learning model 55 to provide the controller parameters RP on the basis of entered system parameters SP. The system parameters SP describe the physical characteristics of a pneumatic system, for example the pneumatic system 100 shown in FIG. 7, in which the compressed air provision device 4 is to be used. The compressed air provision device 4 is configured to perform the closed-loop control on the basis of the provided controller parameters RP.

Exemplarily, the compressed air provision device 4 comprises an interface 57, in particular a communication interface, via which the compressed air provision device 4 receives the setpoint SW and/or the system parameters SP. Preferably, the compressed air provision device 4 comprises a user interface 58 for entering the system parameters SP, in particular by a user. For example, the user interface 58 may comprise a user interface, in particular a graphical user interface, for entering the system parameters SP.

Preferably, the system parameters SP comprise a dimension, a volume, a mass, a friction, an angle, and/or a pressure.

For example, the system parameters SP comprise one or more dimensions of a pneumatic actuator 2 (shown in FIG. 7), in particular a pneumatic drive cylinder, which is controlled via the compressed air provision device 4. For example, the system parameters SP comprise a cylinder diameter, a cylinder length and/or a piston diameter, in particular of the pneumatic actuator 2.

Figure 7:
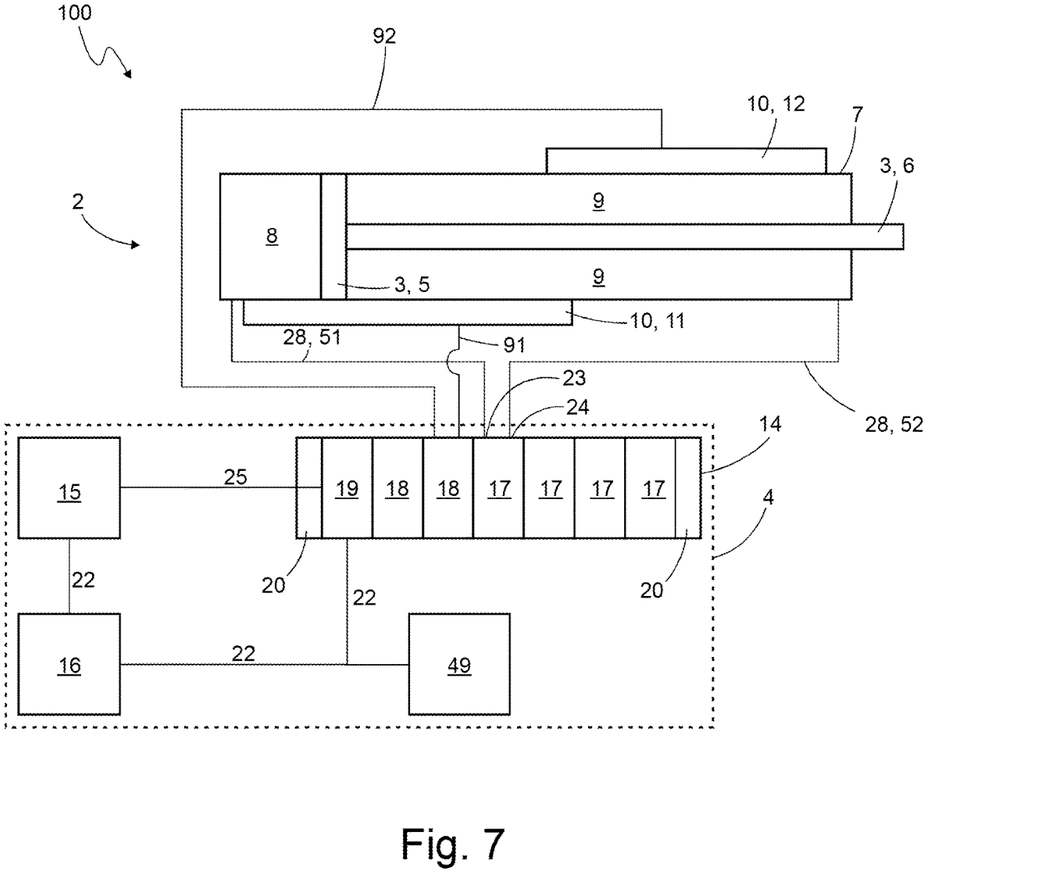

Further, the system parameters SP may include one or more dimensions of a hose arrangement 28. The hose arrangement 28 provides a pneumatic connection between the compressed air provision device 4 and the pneumatic actuator 2. For example, the system parameters comprise a hose length and/or an inner hose diameter, in particular of the hose arrangement 28.

The system parameters SP may further comprise one or more frictions that occur in the system 100, particularly in the pneumatic actuator 2. For example, the system parameters SP comprise a coloumb friction and/or a viscous friction.

Further, the system parameters SP may comprise one or more dead volumes, particularly a dead volume of the pneumatic actuator 2. For example, the system parameters SP may comprise a dead volume at a closure of the pneumatic actuator 2 and/or a dead volume at a bearing cap of the pneumatic actuator 2.

Furthermore, the system parameters SP may comprise one or more masses. For example, the system parameters SP may comprise an intrinsic mass, in particular of the pneumatic actuator 2, for example an intrinsic mass of an actuator member 3 of the pneumatic actuator 2 to be set in motion during the closed-loop control and/or a load mass, in particular of a load object to be set in motion by the pneumatic actuator 2 during the closed-loop control.

Furthermore, the system parameters SP may comprise a center pressure—that is, in particular, a pressure level—of the compressed air and/or the system parameters SP may comprise an installation angle of the pneumatic actuator 2.

Further, the system parameters may comprise calculated system parameters, for example a natural frequency and/or damping, in particular of the uncontrolled system, and/or one or more total masses. Preferably, the calculated system parameters may be calculated from one or more of the aforementioned system parameters. The machine-learning model 55 expediently maps the calculated system parameters to the controller parameters. In particular, the calculated system parameters are pre-aggregated values. Preferably, the pre-aggregated values may be used as input to the machine-learning model 55.

Preferably, the system parameters SP comprise plural or all of the above system parameters.

The machine-learning model preferably comprises a regression method, e.g. a support vector regression, a regression tree and/or an artificial neural network. The support vector regression, the regression tree and/or the artificial neural network expediently provides a mapping of the system parameters SP to the controller parameters RP. In particular, the machine-learning model is based on simulation data. Preferably, the machine-learning model is trained with simulation data, as will be explained in further detail below.

According to one possible embodiment, the controller parameters comprise coefficients of the eigenvalues of the controlled system. The machine-learning model maps the system parameters SP to the coefficients. The controller 54 provides controller gains based on the coefficients using system equations and uses the controller gains in the closed-loop control.

Preferably, the compressed air provision device 4 is configured to adapt the machine-learning model 55 during a start-up, in particular during commissioning, and to provide the controller parameters RP for the closed-loop control using the adapted machine-learning model 55. For example, the compressed air provision device 4 is configured to perform a learning run during commissioning of the compressed air provision device 4 (for example in the system 100), to record measured values during the learning run, for example with the sensor arrangement 56, to adapt the machine-learning model 55 on the basis of the measured values and to provide the controller parameters RP on the basis of the system parameters SP using the adapted machine-learning model 55 and to use the provided controller parameters RP for the closed-loop control.

The controller 54 preferably has a controller model used to provide the closed-loop control. The controller model is a closed-loop controller model. Preferably, the controller model is an at least 2nd order or at least 3rd order system. Exemplarily, the controller model is a 3rd order system. The controller parameters are used to parameterize the controller model, in particular the 3rd order system. For example, the controller parameters comprise a first controller parameter, a second controller parameter and/or a third controller parameter. The first controller parameter and/or the second controller parameter expediently each represent a natural frequency of the controlled system. Exemplarily, the first controller parameter represents a first natural frequency of the controlled system and/or the second controller parameter represents a second natural frequency (in particular different from the first natural frequency) of the controlled system. Preferably, the third controller parameter represents a damping of the controlled system. In particular, the controller 54 provides a non-linear control and is expediently not a PID controller. The controller parameters RP are expediently not changed during ongoing normal operation (in particular outside of commissioning) of the compressed air provision device 4.

As shown in FIG. 1, the system parameters SP may optionally be provided to the controller 54 (in particular directly) so that the controller 54 takes the system parameters SP into account when performing the control.

Preferably, the compressed air provision device 4 comprises a field device, in particular a valve terminal and/or a valve module. The machine-learning model is expediently present in the field device, in particular in the valve terminal and/or the valve module. The provision of the controller parameters RP using the machine-learning model is preferably performed in the field device.

In particular, the compressed air provision device 4 may be operated according to a method comprising the following steps: In a first optional step, the system parameters SP are entered into the compressed air provision device 4, in particular by a user. In a further step, using the machine-learning model 55, the controller parameters RP are provided, in particular calculated, on the basis of the entered system parameters SP. In a further step, the closed-loop control is performed on the basis of the provided controller parameters RP.

Figure 2:
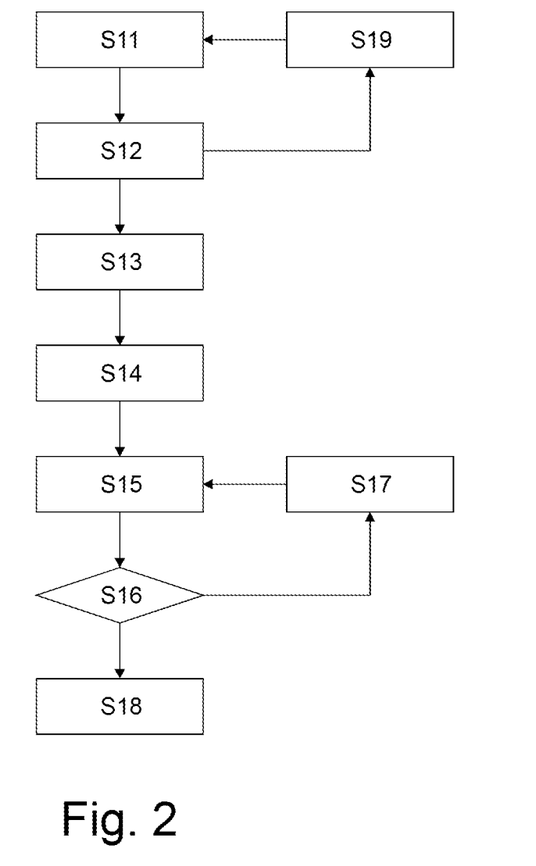
FIG. 2 a flowchart of a first method for providing a machine-learning model, FIG. 3 a block diagram for the generation of simulation data, FIG. 4 a block diagram for training a machine-learning model based on simulation data, FIG. 5 a flowchart of a second method for providing a machine-learning model, FIG. 6 a block diagram for providing the machine-learning model, FIG. 7 a schematic representation of a pneumatic system and FIG. 8 a schematic representation of a valve device.
Figure 3:
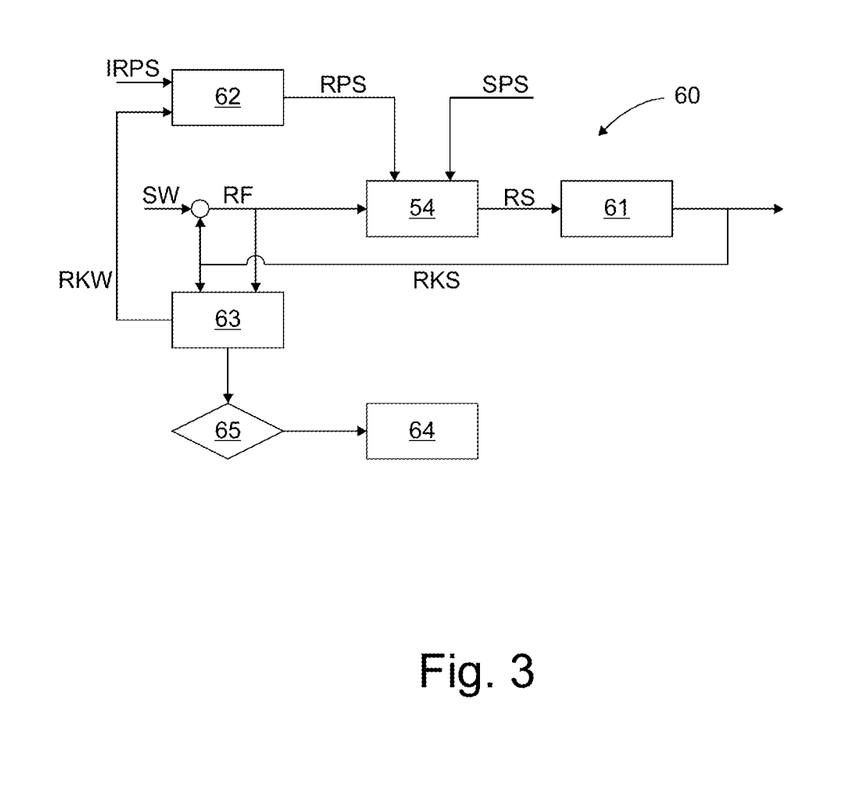
Figure 4:
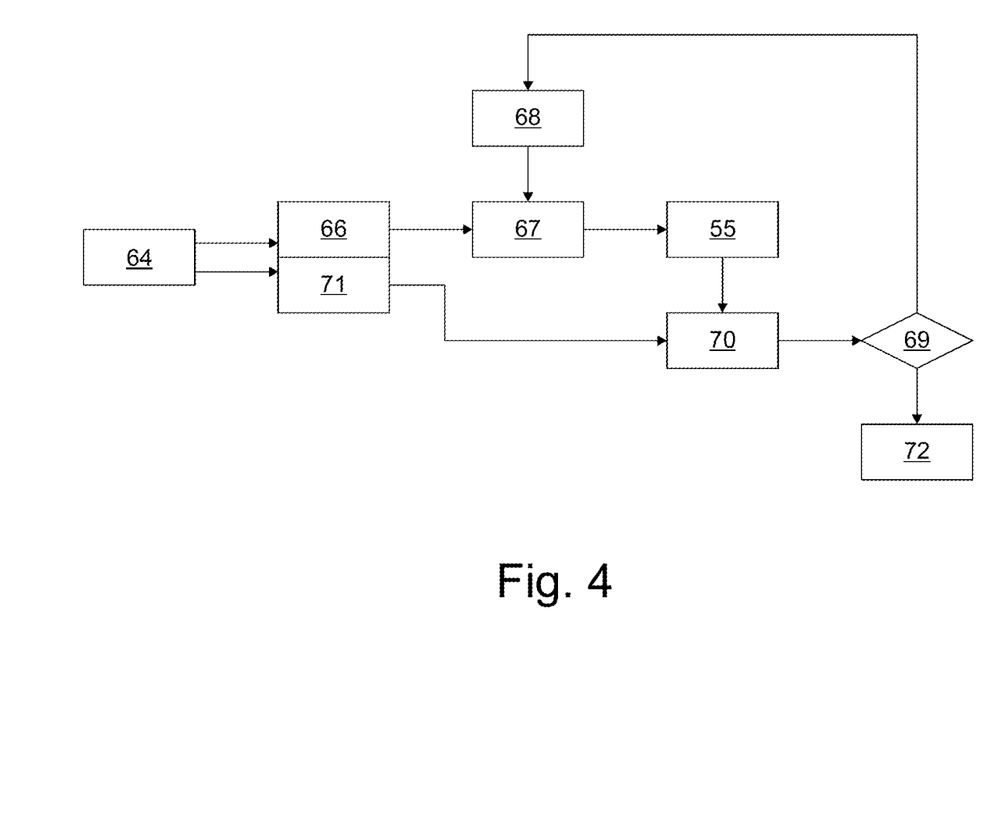

With reference to FIGS. 2, 3 and 4, a method for providing a machine-learning model, in particular the machine-learning model 55 explained above, will be discussed below. The method shall also be referred to as a first method or a supervised learning method. In the first method, simulation data 64 is first generated and then the machine-learning model 55 is trained using the generated simulation data 64. FIG. 2 shows a flowchart of the first method. FIG. 3 shows a block diagram for generating the simulation data 64 and FIG. 4 shows a block diagram for training the machine-learning model 55. The first method is expediently executed on a simulation computer and is performed in particular purely virtually.

The method includes a first step S11 of performing, for a plurality of set combinations of system parameter sets SPS and controller parameter sets RPS, a plurality of simulations of a system 60. In particular, the simulations are performed for different system configurations of the system 60. The system 60 comprises a controller 54, in particular the controller 54 explained above, and a controlled section 61. For example, the system 60 is the pneumatic system 100 explained below. For example, the controlled section 61 comprises the valve device 21 and/or the pneumatic actuator 2. Each system parameter set SPS defines a different system configuration of the system 60. Each system parameter set SPS comprises a plurality of system parameters SP, in particular the system parameters SP explained above. The system parameters SP describe the physical properties of the system 60, in particular the physical properties of the particular system configuration (to be simulated) of the system 60. During the simulations, the system 60 is modeled by the system parameters SP. In particular, the system parameters SP describe the physical properties of the controlled section 61.

Each controller parameter set RPS comprises a plurality of controller parameters RP, in particular the controller parameters RP explained above. In the simulations, a closed-loop control performed by the controller 54 based on the controller parameters RP is simulated. The closed-loop control is thus a simulated closed-loop control, in particular a simulated non-linear closed-loop control. For example, the simulated closed-loop control is a simulated closed-loop position control or a simulated closed-loop pressure control. In particular, in the simulations, the controller model of the controller 54 is parameterized with the controller parameters RP. In each of the simulations, the controller 54 is simulated performing a closed-loop control of the system configuration of the system 60 defined by the respective system parameter set RPS, in particular a closed-loop control of the controlled section 61 defined by the system parameter set SPS, based on the respective controller parameter set RPS. For example, in each simulation, a closed-loop control is simulated based on a setpoint SW output to the controller 54, and a control quality variable is calculated based on the simulated closed-loop control to indicate the quality of the simulated closed-loop control. For example, a control quality is calculated as the control quality variable. In particular, the control quality variable calculated is the (simulated) control error RF and/or the (simulated) feedback signal RKS. The control error RF results, for example, as the difference between the setpoint SW and the feedback signal RKS. The feedback signal RKS is output from the (simulated) controlled section 61, as an example.

Each simulation is performed for a respective set combination of a system parameter set SPS and a controller parameter set RPS. In each simulation of the system 60, a respective control quality variable is calculated for a respective set combination of a system parameter set SPS and a controller parameter set RPS.

As a result of the simulations, simulation result data with a plurality of entries are produced, with a respective entry being present for each simulation and each entry indicating, in particular comprising, the set combination of the respective system parameter set SPS and the respective controller parameter set RPS used in the respective simulation, as well as the respective control quality variable associated with this set combination. Exemplarily, each system parameter set SPS comprises at least 5, at least 10 or at least 15 system parameters SP. Furthermore, exemplarily each controller parameter set RPS comprises at least 2 or at least 3 controller parameters, in particular exactly 3 controller parameters.

The first method comprises a second step S12 of calculating a respective control cost value RKW based on the simulations for each set combination (of a respective system parameter set SPS and a controller parameter set RPS). Expediently, a cost function 63 is provided to calculate the control cost value RKW, in particular based on the control quality variable. Each control cost value RKW indicates the quality of the closed-loop control simulated in a respective simulation. Thus, each control cost value RKW is a measure of how well the controller parameter set RPS used in the respective simulation go together with the respective system parameter set. The better the closed-loop control—i.e. the higher the control quality or the lower the control error—the lower the control cost value RKW. A low control cost value RKW therefore indicates that a controller parameter set and a system parameter set are a good match.

Preferably, in a step S19, the controller parameter sets RPS are adapted, in particular optimized, on the basis of the control cost values RKW. On the basis of the adapted controller parameter sets RPS, the simulations are carried out again in accordance with step S11. On the basis of the simulations, a calculation of control cost values (RKW) is performed again according to step S12. Preferably, the controller parameter sets RPS used for the simulations (performed in step S11) are generated and/or adapted, in particular optimized, using an optimization algorithm 62, for example a gradient-based optimization algorithm. The optimization algorithm used is, for example, fmincon from Matlab. In particular, the optimization algorithm 62 is configured to provide the controller parameter sets RPS such that the control cost value RKW is minimized Exemplarily, the control cost value RKW is provided to the optimization algorithm 62. Exemplarily, an initial control parameter set IRPS is further provided to the optimization algorithm 62, based on which the optimization algorithm 62 provides a first control parameter set for a first simulation. For example, the first control parameter set for the first simulation is the initial control parameter set IRPS. Further, the first control parameter set may be randomly determined, in particular initialized. The control parameter sets RPS for the subsequent simulations are expediently generated by the optimization algorithm 62 in each case on the basis of the most recently performed simulation, in particular on the basis of the control cost value RKW of the most recently performed simulation. Preferably, an iterative adaptation, in particular optimization, of the control parameter set RPS is performed on the basis of the control cost value RKW. The adaptation of the control parameter set RPS according to step S19, the execution of the simulations on the basis of the adapted control parameter sets RPS and the calculation of the control cost values RKW according to step S12 are preferably repeated several times, in particular at least 10, at least 50, at least 100 or at least 500 times.

The first method includes a third step S13 of selecting simulated set combinations (each of a system parameter set SPS and a controller parameter set RPS) based on the calculated control cost values RKW. Based on the selected set combinations, simulation data 64 comprising the selected set combinations is provided. The simulation data 64 comprises a plurality of entries, each entry comprising a simulation parameter set SPS and an associated controller parameter set RPS.

Exemplarily, a selection function 65 is provided that compares each control cost value RKW to a first limit value. Set combinations (each having a system parameter set SPS and a controller parameter set RPS) whose control cost value RKW is smaller than the first limit value are added to the simulation data 64. Set combinations (each having a system parameter set SPS and a controller parameter set RPS) whose control cost value RKW is not smaller than the first limit value are discarded and are not added to the simulation data 64.

The first method comprises a fourth step S14 of creating a training data set 66 based on the simulation data set 64, in particular based on the selected set combinations. Expediently, the training data set 66 comprises a subset of the set combinations included in the simulation data 64 or all of the set combinations included in the simulation data 64. In particular, the training data set 66 comprises a plurality of entries, each entry comprising a respective system parameter set SPS and an associated controller parameter set RPS.

Preferably, a test data set 71 is further created based on the selected set combinations—that is, based on the set combinations of system parameter sets and controller parameter sets included in the simulation data 64. Expediently, the test data set 71 comprises a subset of the set combinations included in the simulation data 64 or all of the set combinations included in the simulation data 64. In particular, the test data set 71 comprises a different subset of set combinations than the training data set 66. In particular, the test data set 66 comprises a plurality of entries, each entry comprising a respective system parameter set SPS and an associated controller parameter set RPS.

The first method includes a fifth step S15 of training the machine-learning model 55 using the training data set 66. Exemplarily, a learning algorithm 67 is provided that trains the machine-learning model 55 using the training data set 66. During the training, regression parameters of the machine-learning model 55, in particular the support vector regression, the regression tree and/or the artificial neural network, are adapted, in particular optimized. In particular, the regression parameters comprise weights, for example in the artificial neural network. Furthermore, hyperparameters of the machine-learning model 55 may be adapted, in particular optimized, during the training. The hyperparameters comprise, for example, the number of neurons and/or the number of layers, in particular of the artificial neural network. In particular, the learning algorithm 67 trains the machine-learning model 55 such that the difference between controller parameters RP calculated by the machine-learning model 55 based on the system parameters SP of the training data set 66 and the controller parameters included in the training data set 66 are minimized.

Exemplarily, the learning algorithm 67 has a learning algorithm cost function that the learning algorithm uses to calculate the difference between the calculated controller parameters and the controller parameters of the training data set 66. In particular, the difference is calculated as the sum of the squares of the differences between calculated controller parameters and controller parameters of the training data set. In particular, the learning algorithm cost function calculates a mean squared error, i.e., a mean squared deviation, in particular difference, between calculated controller parameters and controller parameters of the training data set.

Exemplarily, the first method further comprises a sixth step S16 of testing the trained machine-learning model 55 using the test data set 71. Exemplary, the evaluation function 70 is provided that tests the trained machine-learning model 55 using the test data set 71. In particular, the evaluation function 70 feeds the system parameter sets SPS of the test data set 71 to the machine-learning model 55 such that the machine-learning model 55 computes controller parameter sets based on the system parameter sets SPS. The evaluation function 70 expediently comprises an evaluation cost function for calculating an evaluation cost value, in particular indicating the difference between the calculated controller parameters and the controller parameters of the test data set 71. In particular, the evaluation cost value is calculated as the sum of the squares of the differences between calculated controller parameters and controller parameters of the test data set 71. In particular, the evaluation cost function calculates a mean squared error, i.e. a mean squared deviation, in particular difference, between calculated controller parameters and controller parameters of the test data set.

Preferably, the machine-learning model, in particular the regression parameters, is adjusted depending on the result of the testing of the trained machine-learning model. Furthermore, an adjustment of hyperparameters of the machine-learning model 55 may be performed, in particular depending on the result of the testing of the trained machine-learning model.

Exemplarily, a comparison function 69 is provided that compares the evaluation cost value to a second limit value. If the evaluation cost value is greater than the second limit value, the method proceeds to the seventh step S17. If the evaluation cost value is smaller than the second limit value, the method proceeds to the eighth step S18.

In the seventh step S17, the training of the machine-learning model 55 is adapted, exemplarily via a learning algorithm adaptation function 68 that adapts the learning algorithm, in particular hyperparameters of the learning algorithm, exemplarily based on the result of the comparison function 69 and/or the result of the evaluation function 70. The method then returns to the step S15. The adjustment of the training, the training of the machine-learning model and the testing of the machine-learning model is expediently repeated until the evaluation cost value is smaller than the second threshold value.

Preferably, an iterative adaptation of the training and/or of the machine-learning model is performed, in particular as a function of the evaluation cost value. The adaptation of the training of the machine-learning model 55 according to step S17, the training of the machine-learning model 55 according to step S15 and the testing of the machine-learning model 55 according to step S16 are preferably repeated several times, in particular at least 10, at least 50, at least 100 or at least 500 times.

In the eighth step S18, the training is terminated and the machine-learning model 55 is provided, for example on a controller device 72. The controller device 72 is, for example, the compressed air provision device 4.

Thus, in the first method explained above, that is, in the supervised-learning method, there are two phases: a data generation phase, in which the simulation data 64 is generated, and a training phase, in which the machine-learning model 55 is trained with the simulation data 64. In the data generation phase, an optimizer—the optimization algorithm 62—is used to determine an optimal controller parameter set RPS for a specific system configuration (defined by the system parameter set SPS). Exemplarily, the cost function 63 is minimized by the controller parameters. For the optimization algorithm 62, in particular the minimization, a numerical method is expediently used (and in particular not a machine-learning method or artificial intelligence method). In the training phase, the simulation data 64 (identified controller parameters for specific system configurations) are used to train a regression method—the machine-learning model 55—thereon.

In the data generation phase, a simulatable overall system comprising the controller 54 and the controlled section 61 is numerically simulated as the system 60 by way of example. The system parameters of the system parameter sets SPS on which the simulations are based are varied, in particular based on experimental plans and/or based on statistics. The optimization algorithm 62 preferably performs a numerical optimization of the controller parameter sets RPS for the different system parameter sets SPS.

For the training phase, preferably only "good" data from the data generation phase is used, i.e. data for which the cost function 63 used to evaluate the simulation result data is below the first limit value. The resulting data—the simulation data 64—may be split into two matrices, for example. A first matrix containing all the system parameter sets of the simulation data, and a second matrix containing the controller parameter sets associated with the system parameter sets. The simulation data, in particular the two matrices, are expediently divided into the training data set 66 and the test data set 71. The training data set 66 is used to learn the regression parameters of the machine-learning model 55. The test data set 71 is used for evaluating the learned regression parameters, and may additionally be used to determine appropriate hyperparameters. For example, the training data set 66 is used to train a plurality of machine-learning models 55 and the machine-learning model 55 with the lowest evaluation cost value is selected and deployed, particularly on the controller device 72.

Figure 5:
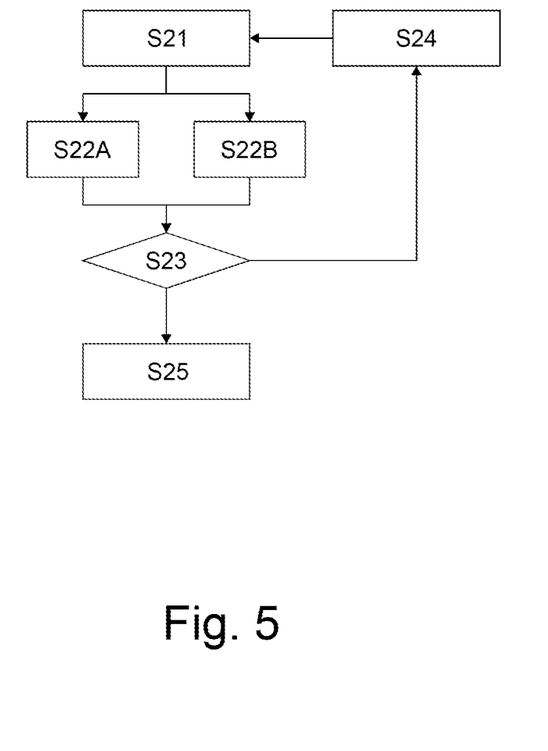
Figure 6:
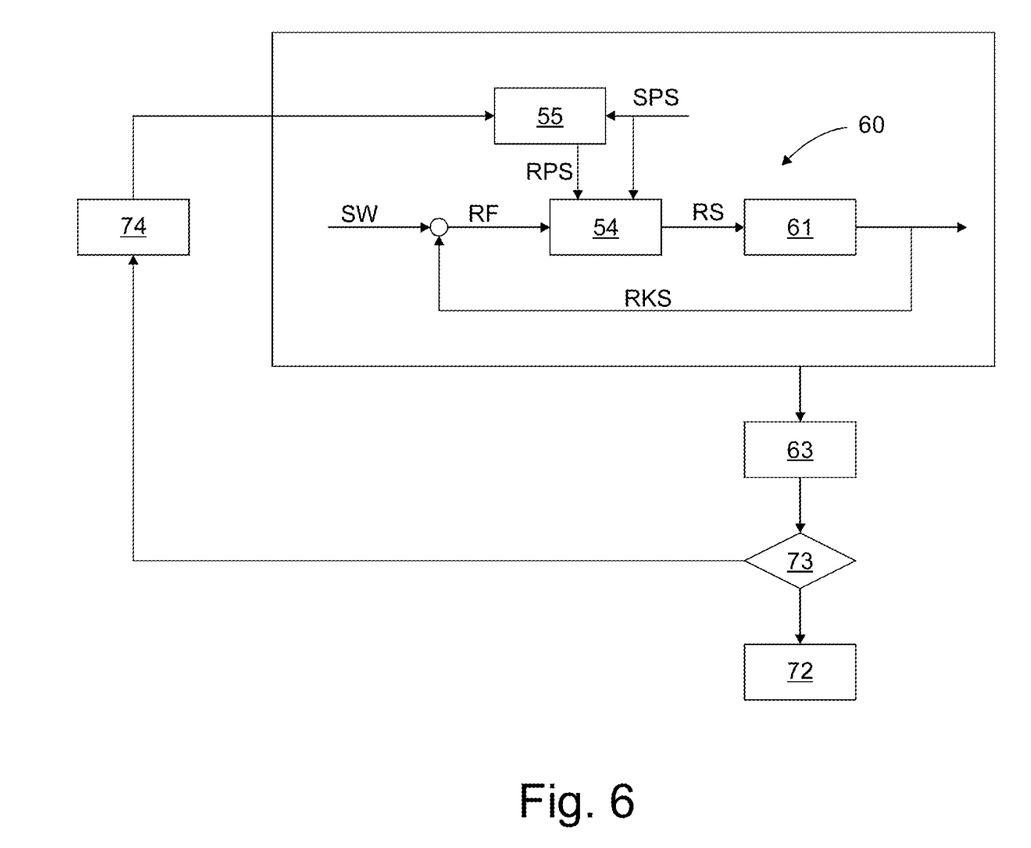

With reference to FIGS. 5 and 6, a further method for providing a machine-learning model, in particular the machine-learning model 55 explained above, will be discussed below. The further method shall also be referred to as a second method or an adaptive learning method. In the second method, controller parameter sets calculated by (an initially provided) machine-learning model 55 are judged by means of simulations of a system 60 and the machine-learning model 55 is adapted based on the simulations. FIG. 5 shows a flowchart of the second method. FIG. 6 shows a block diagram of the second method. The second method is expediently carried out on a simulation computer and is in particular performed purely virtually.

The second method comprises a first step S21 in which, using the machine-learning model 55, a controller parameter set RPS is provided, in particular calculated, on the basis of a system parameter set SPS. Exemplarily, as the machine-learning model 55, initially (in particular in the first execution of the first step S21) an initial machine-learning model is used which is based, for example, on random parameters, in particular random regression parameters.

The system parameter set SPS includes system parameters SP that describe physical properties of a system 60. For example, the system parameters SP are the system parameters SP explained above. The system 60 comprises a controller 54, in particular the controller 54 explained above, and a controlled section 61. For example, the system 60 is the pneumatic system 100 explained below. For example, the controlled section 61 comprises the valve device 21 and/or the pneumatic actuator 2.

The second method further comprises a second step S22A of performing a simulation of the system 60. The simulation involves simulating how the controller 64 performs closed-loop control of the controlled section 61 based on the controller parameters set RPS. In the simulation, the system 60 is modeled using the system parameters SP. In particular, the system parameters SP describe the physical characteristics of the controlled section 61. The controller parameter set RPS comprises a plurality of controller parameters RP, in particular the controller parameters RP explained above. In the simulation, the closed-loop control performed by the controller 54 is based on the controller parameters RP. The closed-loop control is a simulated closed-loop control, in particular a simulated non-linear closed-loop control. For example, the simulated control is a simulated closed-loop position control or a simulated closed-loop pressure control. In particular, in the simulation the controller model of the controller 54 is parameterized with the controller parameters RP. In the simulation, the controller 54 is simulated to perform a closed-loop control of the system 60 defined by the system parameter set SPS, in particular of the controlled section 61 defined by the system parameter set, based on the controller parameter set RPS. For example, in the simulation, a closed-loop control is simulated based on a setpoint SW output to the controller 54, and a control quality variable is calculated based on the simulated closed-loop control to indicate the quality of the simulated closed-loop control. For example, a control quality is calculated as the control quality variable. In particular, the control quality variable calculated is the (simulated) control error RF and/or the (simulated) feedback signal RKS. The control error RF results, for example, as the difference between the setpoint SW and the feedback signal RKS. The feedback signal RKS is output from the (simulated) controlled section 61, as an example.

Alternatively, or in addition to the second step S22A, a modified second step S22B may be performed in which real closed-loop control (i.e., not simulated closed-loop control) of the controlled section 61 is performed by the controller 54 based on the controller parameters set RPS. The controlled section 61 is a real—that is, a physically existing—controlled section. In the second step S22B, the system parameter set SPS used describes the real system, for example the system 100 on which the closed-loop control is performed. Using step S22B, the second method can be implemented on a target hardware, for example, by evaluating the cost function 63 (explained below) directly for the real setup. In this way, further functions, such as fine-tuning on a specific application, can be implemented. In particular, by means of the second step S22B, optimizations can be performed on the real system for a concrete application.

Preferably, steps S21 and S22A (and/or S22B) are performed for a plurality of different system parameter sets.

The second method comprises a third step S23 of calculating a control cost value based on the simulation (or simulations, if multiple simulations are performed). Provided that step S22B is performed, the control cost value may be determined based on the real control. Expediently, a cost function 63 is provided to calculate the control cost value RKW, in particular based on the control quality variable. The control cost value RKW indicates the quality of the control simulated during the simulation and/or the quality of the real control. Thus, the control cost value RKW is a measure of how well the controller parameters set RPS used in the simulation (and/or in the real control) go together with the system parameter set. The better the control—i.e. the higher the control quality or the lower the control error—the lower the control cost value RKW. A low control cost value RKW therefore indicates that a controller parameter set and a system parameter set are a good match.

Optionally, a gradient-based optimization method may be used. In this case, several simulations are expediently performed to determine a gradient of the cost function or the control cost value, in particular numerically and/or depending on the controller parameter set.

Depending on the control cost value, the machine-learning model 55 is adapted and the above steps S21, S22A (and/or S22B) and S23 are repeated. Steps S21, S22A (and/or S22B) and S23 are repeated until a termination criterion is met, for example until the control cost value is less than a threshold value.

Exemplarily, a judgment function 73 is provided that uses the control cost value to judge whether the machine-learning model 55 should be provided in its current state or whether the machine-learning model 55 needs to be further adapted. For example, the judgement function 73 uses the control cost value to assess whether a termination criterion for adapting the machine-learning model 55 is met. For example, the control cost value or a gradient of the control cost value is compared to a threshold value. Provided that the control cost value (or the gradient of the control cost value) is greater than the threshold value, the method proceeds to the fourth step S24. If the control cost value (or the gradient of the control cost value) is smaller than the second limit value, the method proceeds to the fifth step S25.

In the fourth step S24, the machine-learning model 55 is adapted, exemplarily regression parameters of the machine-learning model 55 are adapted. In particular, regression parameters of a support vector regression, a regression tree and/or an artificial neural network of the machine-learning model 55 are adapted. Exemplarily, an adaptation function 74 is provided that performs the adaptation of the machine-learning model 55. Expediently, the adaptation function 74 employs an optimization method, such as a steepest slope method. The method then returns to the step S21. Steps S21, S22A (and/or S22B), S23 and S24 are expediently repeated until the termination criterion is satisfied, for example until the control cost value is less than the second limit value.

Preferably, an iterative adaptation of the machine-learning model is performed, in particular as a function of the control cost value. The adaptation of the machine-learning model according to step S24, the provision of the controller parameters set according to step S21, the execution of a simulation according to step S22A and/or the execution of a control according to step S22B and the calculation of the control cost value according to step S23 are preferably repeated several times, in particular at least 10, at least 50, at least 100 or at least 500 times.

In the fifth step S25, the method is terminated and the machine-learning model 55 is provided, for example on a controller device 72. The controller device 72 is, for example, the compressed air provision device 4.

In the second method described above, i.e., the adaptive learning method, the cost function 63 is minimized to determine regression parameters of the machine-learning model 55. This cost function 63 directly models the controller performance of the controller 54 by, for example, penalizing positioning inaccuracies. Simulation is performed to determine the controller performance.

The second method expediently does not comprise a step of calculating a cost function of a controller parameter deviation.

In particular, in the second method, no training data set is generated. Preferably, the first execution of step S21 uses a machine-learning model that is not yet trained.

Alternatively, the first execution of step S21 may use the machine-learning model 55 obtained by the first method—that is, in particular, a machine-learning model that has already been trained with the training dataset. Preferably, therefore, the machine-learning model used in the second method is provided using the first method.

The machine-learning model 55 provided by means of the first and/or the second method is preferably used in the compressed air provision device 4.

With reference to FIG. 7, a system 100 will be explained below. The system 100 comprises the compressed air provision device 4, a pneumatic actuator 2 and a hose arrangement 28. The system 100 represents an exemplary application environment for the compressed air provision device 4. The compressed air provision device 4 can also be provided on its own, i.e. without the pneumatic actuator 2 and/or the hose arrangement 28.

The compressed air provision device 4 comprises the valve arrangement 14, which is exemplarily configured as a valve terminal, via which compressed air is supplied for the closed-loop control, in particular the closed-loop position control and/or the closed-loop pressure control, for example of the actuator 2. The control is performed on the basis of the controller parameters RP provided by the machine-learning model 55. The valve arrangement 14 does not necessarily have to be a valve terminal. For example, the valve arrangement 14 may also be a single valve or other valve unit.

Two pressure outputs 23, 24 are provided on the valve arrangement 14 for providing the compressed air. Each of the two pressure outputs 23, 24 is pneumatically connected to a respective pressure chamber 8, 9 of the pneumatic actuator 2. In an alternative embodiment in which the actuator 2 comprises only one pressure chamber, only one pressure output is connected to a pressure chamber.

The valve arrangement 14 has a pressure sensor arrangement 29 with pressure sensors with which the pressure at the pressure outputs 23, 24 and/or the pressure in an de-aeration port 26 and/or a aeration port 27 can be measured. In particular, the pressure sensor arrangement 29 is part of the sensor arrangement 56.

Exemplarily, the valve arrangement 14 comprises a plurality of modules, for example valve modules 17 and/or I/O modules 18. The valve arrangement 14 further comprises a control unit 19, which is preferably also implemented as a module. Suitably, the valve arrangement 14 comprises a support body 20, in particular a support plate, on which the control unit 19, the valve modules 17 and/or the I/O module 18 are arranged.

The computing unit 53 is preferably part of the control unit 19 or a valve module 17, and the machine-learning model 55 is preferably present in the control unit 19 or a valve module 17.

In an exemplary embodiment, the valve arrangement 14 is designed as a row module arrangement and can in particular also be referred to as a valve island. The aforementioned modules are in particular row modules, which are preferably designed in the form of plates. In particular, the valve modules 17 are designed as valve plates. The row modules are expediently arranged in a row, in particular along the longitudinal axis of the valve arrangement 14.

In an exemplary embodiment, the compressed air provision device 4 further comprises a higher-level controller 15 and/or optionally a cloud server 16 and/or a user device 49. For example, the user interface 58 is part of the higher-level controller 15, the cloud server 16 and/or the user device 49.

Advantageously, the valve arrangement 14 is communicatively connected to the higher-level controller 15 and/or the cloud server 16. Preferably, the valve arrangement 14 is connected to the higher-level controller 15 via a bus 25, in particular a local bus, for example a field bus, and/or optionally connected to the cloud server 16 via a wide area network 22, for example the Internet.

Exemplarily, the actuator 2 comprises a position sensor device 10 for detecting a position of the actuator member 3. In particular, the position sensor device 10 is part of the sensor arrangement 56 and is expediently connected to the valve arrangement 14 via communication lines 91, 92.

The pneumatic actuator 2 is expediently a pneumatic actuator to which compressed air can be applied. Exemplarily, the pneumatic actuator 2 is designed as a drive, in particular as a drive cylinder. Exemplarily, the pneumatic actuator 2 comprises an actuator body 7, the actuator member 3 and at least one pressure chamber 8, 9. Expediently, the pneumatic actuator 2 comprises two pressure chambers 8, 9 which can be separately acted upon by the compressed air and is in particular designed as a double-acting actuator. Alternatively, the pneumatic actuator 2 can also have only one pressure chamber and accordingly be designed as a single-acting actuator.

The actuator body 7 is preferably designed as a cylinder and has an internal volume. The actuator member 3 comprises, for example, a piston 5 and/or a piston rod 6. The piston 5 is arranged in the actuator body 7 and divides the internal volume of the actuator body 7 into the two pressure chambers 8, 9.

In an exemplary embodiment, the hose arrangement 28 comprises two hoses 51, 52. A first hose 51 pneumatically connects the first pressure output 23 to the first pressure chamber 8 and a second hose 52 pneumatically connects the second pressure output 24 to the second pressure chamber 9. In an alternative embodiment in which the pneumatic actuator 2 comprises only one pressure chamber, the hose arrangement 28 expediently comprises only one hose.

In an exemplary embodiment, the higher-level controller 15 is a programmable logic controller, and is communicatively connected to the valve arrangement 14, in particular to the control unit 19. Expediently, the higher-level controller 15 is further connected to the cloud server 16, in particular via a wide area network 22, preferably via the Internet. The higher-level controller 15 is expediently designed to provide a setpoint signal SWS that specifies the (setpoint) position to which the actuator member 3 is closed-loop controlled within the closed-loop position control.

In an exemplary embodiment, the user device 49 is a mobile device, such as a smartphone, a tablet computer, and/or a notebook computer. Further, the user device 49 may be a desktop computer, for example a PC. The user device 49 is suitably communicatively connected to the control unit 19, the cloud server 16 and/or the higher-level controller 15, in particular via a wide area network 22, for example the Internet. In particular, the user device 49 is configured for user input of the system parameters SP. The user device 49 can expediently be used to access a user interface with which the system parameters SP can be entered. The user interface is suitably a web interface. Further, the user interface may be used to select, activate, and/or load an application program providing the machine-learning model 55 and/or the controller 54 onto the control unit 19 and/or a valve module 17.

Expediently, the cloud server 16 is located remotely from the valve arrangement 14 and/or the pneumatic actuator 2, in particular at a different geographical location. Preferably, the cloud server 16 is configured to provide the application program. The application program can be loaded from the cloud server 16 to the higher-level controller and/or the control unit 19 and/or the valve module 17, expediently in response to a user input made with the user device 49.

Figure 8:
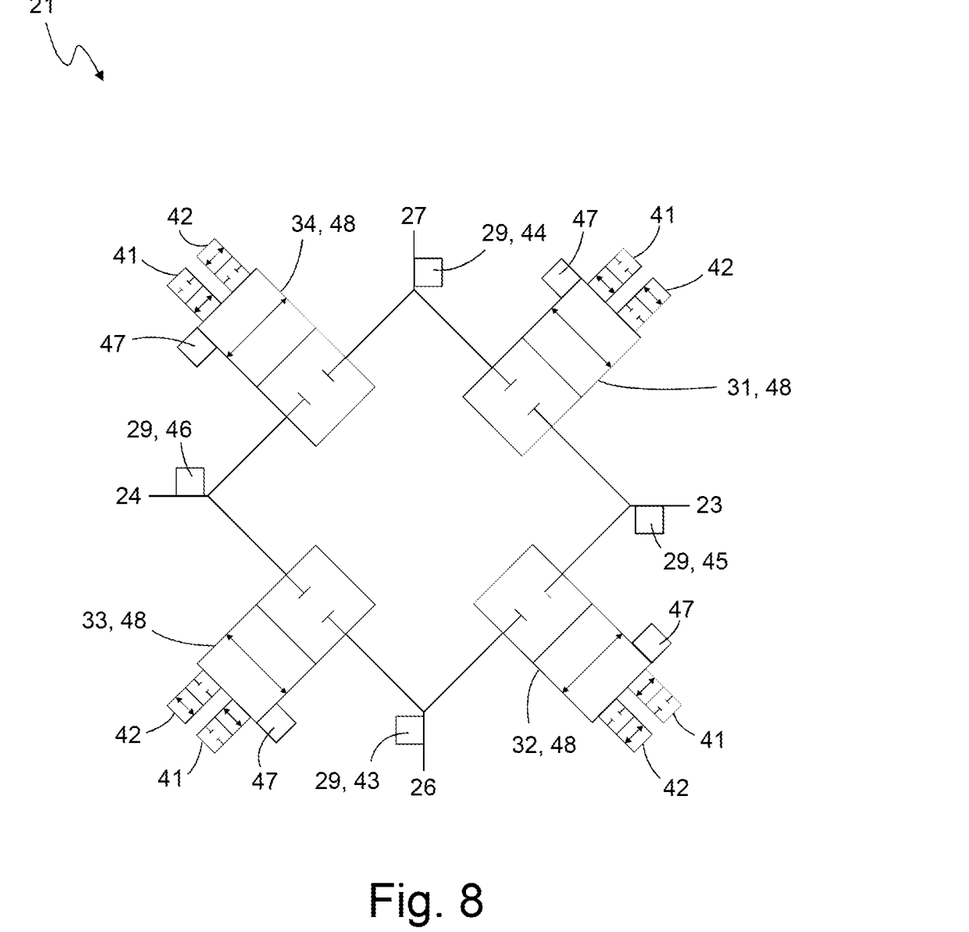

FIG. 8 shows an exemplary valve device 21, with which the pressures for the pressure chambers 8, 9 can be provided. The valve device 21 is part of the compressed air provision device 4, in particular of the valve arrangement 14, preferably of a valve module 17.

The valve device 21 has the two pressure outputs 23, 24 with which two separate compressed air pressures and/or two separate compressed air mass flows can be provided. The valve device 21 further comprises an de-aeration port 26 connected to a de-aeration line and an aeration port 27 connected to an aeration line. Expediently, a supply pressure is applied to the aeration port 27 and/or atmospheric pressure is applied to the de-aeration port 26.

For each pressure output 23, 24, the valve device 21 comprises one or more valve members 48 by means of which the size of a respective output opening through which compressed air is passed when it is provided at a respective pressure output 23, 24 is adjustable.

In FIG. 2, the valve device 21 is exemplarily designed as a full bridge comprising four 2/2-way valves 31, 32, 33, 34. A first 2/2-way valve 31 is connected between the aeration port 27 and the first pressure output 23, a second 2/2-way valve 32 is connected between the first pressure output 23 and the de-aeration port 26, a third 2/2-way valve is connected between the de-aeration port 26 and the second pressure output 24, and a fourth 2/2-way valve is connected between the second pressure output 24 and the aeration port 27.

The first pressure output 23 can selectively be connected to the de-aeration line via the first 2/2-way valve or to the aeration line via the second 2/2-way valve, and the second pressure output 24 can selectively be connected to the de-aeration line via the third 2/2-way valve or to the aeration line via the fourth 2/2-way valve.

Each 2/2-way valve 31, 32, 33, 34 is exemplarily configured as a proportional valve; that is, each 2/2-way valve 31, 32, 33, 34 has a valve member 48 that can be moved to an open position, a closed position, and arbitrary intermediate positions between the open and closed positions. Preferably, the 2/2-way valves 31, 32, 33, 34 are pilot operated valves each having two pilot valves 41, 42 through which the valve member can be actuated. The pilot valves 41, 42 are exemplarily designed as piezo valves. Via the position of the respective valve member 48, the aforementioned output opening can be expediently adjusted.

Exemplarily, the first and second 2/2-way valves 31, 32 form a first half-bridge and the third and fourth 2/2-way valves 33, 34 form a second half-bridge. Preferably, the output opening of the first pressure output 23 is adjustable via the first half-bridge and the output opening of the second pressure output 24 is adjustable via the second half-bridge.

Expediently, the valve arrangement 14 comprises the pressure sensor arrangement 29 comprising one or more pressure sensors to sense pressures of the valve arrangement 14, in particular the valve device 21.

Exemplarily, the valve arrangement 14, in particular the valve device 21, comprises a first pressure-output pressure sensor 45 for detecting the pressure provided at the first pressure output 23 and/or a second pressure-output pressure sensor 46 for detecting the pressure provided at the second pressure output 24. Expediently, the valve arrangement 14, in particular the valve device 21, further comprises a supply air pressure sensor 44 for sensing the pressure provided at the aeration port 27 and/or an exhaust air pressure sensor 43 for sensing the pressure provided at the de-aeration port 26.

The valve arrangement 14, in particular the valve device 21, expediently comprises stroke sensors 47 for detecting the position of the valve members 48. In particular, the compressed air provision device 4 is adapted to determine the size of the output openings of the pressure outputs 23, 24 by means of the stroke sensors 47.

The pressure sensor arrangement 29 and/or the stroke sensors 47 are suitably part of the sensor arrangement 56.

What is claimed is:

1. A system comprising a drive cylinder and a compressed air provision device for carrying out a closed-loop control of the drive cylinder on the basis of controller parameters, wherein the closed-loop control is a closed-loop position control or a closed-loop pressure control, the compressed air provision device comprising a sensor arrangement for providing a feedback signal, a computing unit executing a controller algorithm for providing a controller signal based on a setpoint and the feedback signal, the compressed air provision device further comprising a valve device for outputting compressed air to the drive cylinder, the compressed air provision device having a machine-learning model and being adapted to provide, using the machine-learning model, the controller parameters on the basis of entered system parameters which describe physical properties of a system in which the compressed air provision device is to be used, and to carry out the closed-loop control on the basis of the provided controller parameters, wherein the system parameters comprise a dimension, a volume, a mass, a friction, an angle and/or a pressure.

2. The system according to claim 1, further comprising a user interface for entering the system parameters.

3. The system according to claim 1, wherein the controller parameters comprise controller gains.

4. The system according to claim 1, wherein the machine-learning model comprises a regression method.

5. The system according to claim 4, wherein the regression method comprises a support vector regression, a regression tree and/or an artificial neural network.

6. The system according to claim 1, wherein the machine-learning model is based on simulation data.

7. The system according to claim 1, wherein the compressed air provision device is designed to adapt the machine-learning model during commissioning and, using the adapted machine-learning model, to provide the controller parameters for the closed-loop control.

8. A method of operating a compressed air provision device for carrying out a closed-loop control on the basis of controller parameters, the compressed air provision device having a machine-learning model and being adapted to provide, using the machine-learning model, the controller parameters on the basis of entered system parameters which describe physical properties of a system in which the compressed air provision device is to be used, and to carry out the closed-loop control on the basis of the provided controller parameters, the method according to claim 1, comprising the steps of: by using the machine-learning model, providing the controller parameters based on the input system parameters; and performing the closed-loop control based on the provided controller parameters, and wherein the method further comprises the following steps for training the machine-learning module:

performing a plurality of simulations of a system, which has a controller and a controlled section, for a plurality of set combinations of system parameter sets and controller parameter sets, wherein each system parameter set comprises a plurality of system parameters describing physical characteristics of a respective system configuration of the system and wherein each controller parameter set comprises a plurality of controller parameters, wherein each simulation simulates how the controller performs closed-loop control of the controlled section based on the respective controller parameter set, and wherein each simulation is performed for a respective set combination of a system parameter set and a controller parameter set;

based on the simulations, calculating a respective control cost value for each set combination;

selecting set combinations based on the calculated control cost values;

creating a training data set based on the selected set combinations; and training the machine-learning model with the training dataset.

9. The method according to claim 8, wherein the system parameters comprise a dimension, a volume, a mass, a friction, an angle and/or a pressure.

10. The method of claim 8, comprising the steps of:
adjusting controller parameter sets based on the control cost values; and
re-running the simulations based on the adjusted controller parameter sets.

11. The method according to claim 8, further comprising the steps of:
creating a test data set based on the selected set combinations;
testing the trained machine-learning model using the test data set; and
adjusting the machine-learning model depending on the result of the testing of the trained machine-learning model.

12. The method according to claim 8, further comprising the following steps for the machine-learning model:
by using the machine-learning model, providing a controller parameter set based on a system parameter set, wherein the controller parameter set comprises a plurality of controller parameters and the system parameter set comprises a plurality of system parameters describing the physical characteristics of a system comprising a controller and a controlled section;
performing a simulation of the system, simulating how the controller performs closed-loop control of the controlled section based on the controller parameters set, and/or performing a real closed-loop control of the controlled section by the controller based on the controller parameters set;
calculating a control cost value based on the simulation and/or the real closed-loop control; and
depending on the control cost value, adjusting the machine-learning model and repeating the above steps.

13. The method according to claim 8 further comprising the steps of:
by using the trained machine learning module, providing a controller parameter set based on a system parameter set, wherein the controller parameter set comprises a plurality of controller parameters and the system parameter set comprises a plurality of system parameters describing the physical characteristics of a system comprising a controller and a controlled section;
performing a simulation of the system, simulating how the controller performs closed-loop control of the controlled section based on the controller parameters set, and/or performing a real closed-loop control of the controlled section by the controller based on the controller parameters set;
calculating a control cost value based on the simulation and/or the real closed-loop control; and
depending on the control cost value, adjusting the machine-learning model and repeating the above steps.

14. The method according to claim 8, wherein the closed-loop control comprises a closed-loop position control and/or a closed-loop pressure control.

* * * * *